Feb. 6, 1968            N. L. FITCH            3,367,044
DISH AND DISH TRAY DRIER AND STERILIZER
Filed Jan. 4, 1966            2 Sheets-Sheet 1
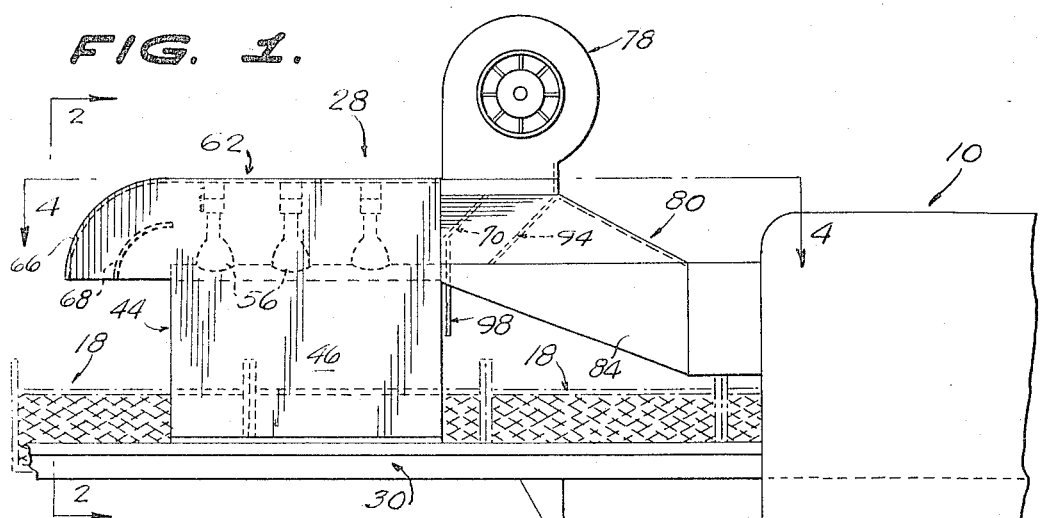
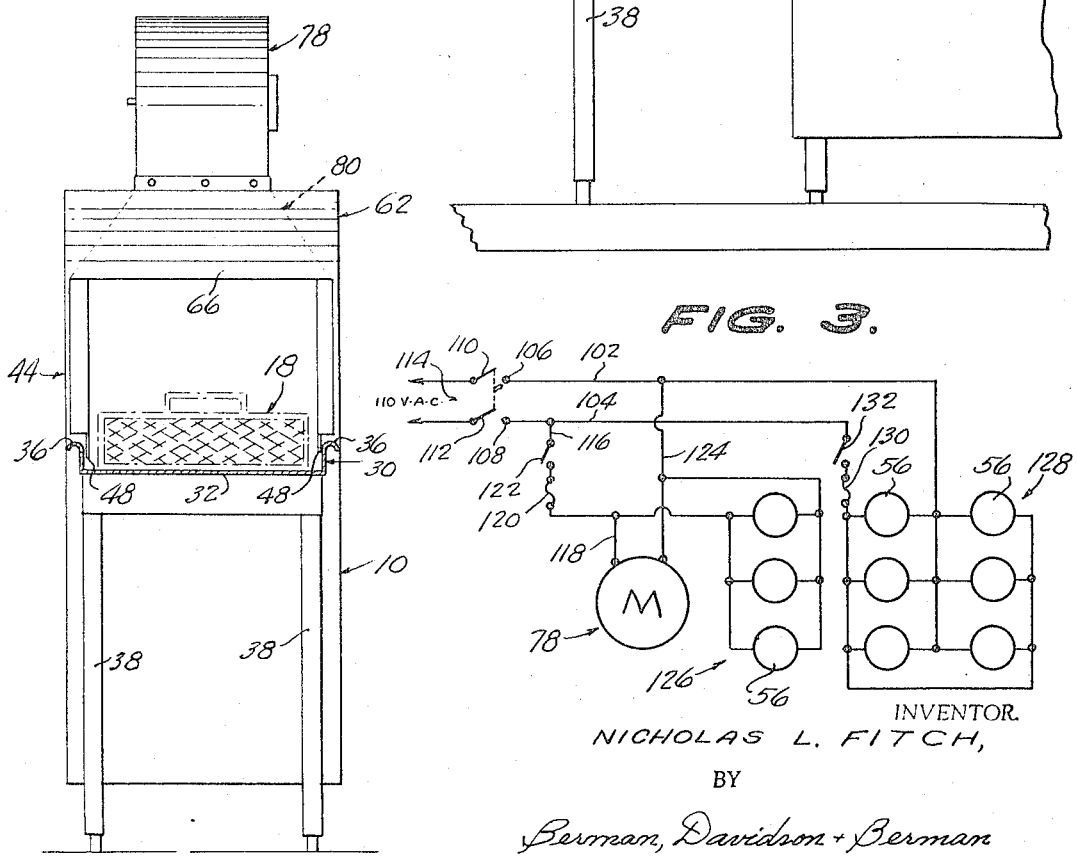
INVENTOR.
NICHOLAS L. FITCH,
BY
Berman, Davidson + Berman
ATTORNEYS.

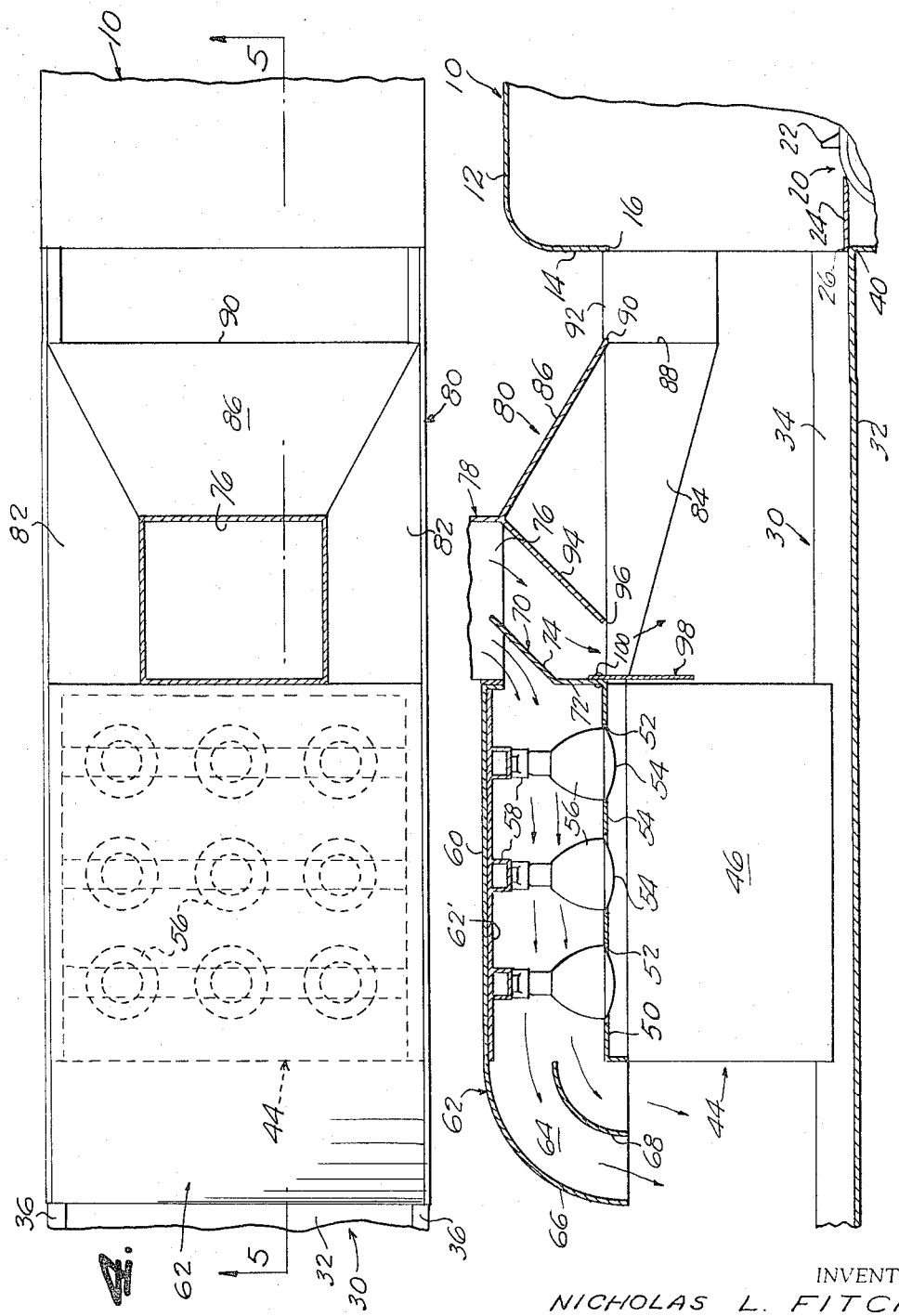

United States Patent Office 3,367,044
Patented Feb. 6, 1968

3,367,044
DISH AND DISH TRAY DRIER
AND STERILIZER
Nicholas L. Fitch, Mesa, Ariz., assignor, by direct and mesne assignments, to F & M Enterprises, Inc., Mesa, Ariz., a corporation of Arizona
Filed Jan. 4, 1966, Ser. No. 518,639
3 Claims. (Cl. 34—197)

ABSTRACT OF THE DISCLOSURE

A dish dryer comprising a water stripping chamber followed by a heating chamber followed by a cooling area; and means for splitting an air blast between said stripping chamber and said cooling area.

---

This invention relates to a drier and sterilizer for dishes and dish trays emerging from commercial dishwashers.

Dishes and the trays in which they are contained while being washed in commercial washers emerge from the washers in a wet and hot condition which precludes immediate manual handling and utilization thereof, so that time must be allowed to elapse before the trays can be unloaded of their contents and their contents put to use. During this undesirable and uneconomic time lapse, any sterilization effects which may have been obtained in the transit of the dishes and trays through the washers are diminished or lost.

The primary object of the present invention is the provision of a compact, efficient, and quick-acting device, as an adjunct for a commercial dishwasher, which performs a continuous cycle of water removal or stripping, drying, sterilizing, and cooling of trays and contained dishes as the trays and dishes are discharged from the washer, so that, at the end of the cycle the trays and dishes are immediately available for manual handling and utilization, in a cool, dry, and sterilized condition.

Another object of the invention is the provision of a device of the character indicated above, of low initial cost and economical of operation, wherein the stripping of water from the dishes and trays is done by means of forced air provided by a blower, the drying and sterilization is done by means of electric lamps, and the cooling is done by means of a part of the same forced air utilized in the stripping; and wherein the dish-loaded trays emerge in a line from the washer and move along a table component of the device, the trays being discharged from the washer and moved along the table by the washer's existing mechanical discharging means.

In the drawings:

FIGURE 1 is a fragmentray side elevation, showing a device of the invention associated with a commercial dishwasher, and a line of dish trays in transit therefrom on the device's table;

FIGURE 2 is a vertical transverse section, taken on the line 2—2 of FIGURE 1;

FIGURE 3 is a wiring diagram of the device;

FIGURE 4 is a horizontal section, taken on the line 4—4 of FIGURE 1; and,

FIGURE 5 is a fragmentary vertical longitudinal section, taken on the line 5—5 of FIGURE 4.

Referring in detail to the drawings, a commercial dishwasher 10 is shown, having a closed housing 12, a side wall 14 of which is formed with a rectangular discharge opening 16, through which loaded reticulated dish trays 18 are discharged horizontally, by suitable mechanical means, existent within the dishwasher, such as a horizontal conveyor 20, from which rise teeth 22, which engage and push the trays out of the opening 16, as by engaging in reticulations in the bottoms of the trays. The dishwasher may have, as shown, a limited area horizontal flange 24, at the level of the conveyor 20 and on a level with the lower edge 26 of the discharge opening 16, onto which flange the discharged trays are pushed out of the opening 16.

A device 28, of the present invention, comprises a channel cross section horizontal table 30, long enough to accommodate, end-to-end, a line of trays 18. The table 30 has a flat bottom wall 32, and upstanding side walls 34, the latter preferably having rounded and turned over protective upper edges 36. The bottom wall 32 of the table 30 is suitably supported, as on floor engaging legs 38, on a level with the washer flange 24, with its inner end 40 close to or abutting the washer side wall 14. If desired, the table 30 can be bolted or otherwise secured to the washer 10.

Suitably and securely supported, on the table side walls 34, and the washer 10, is a hood assembly which comprises an inverted U-shaped drying and sterilizing chamber 44, at least as long as a single dish tray 18, and spaced outwardly from the washer 10 a distance at least equal to the length of a tray 18.

The chamber 44 comprises perpendicular side walls 46 which, at their lower ends, extend into the table 30, at the inner sides of the table side walls, as indicated at 48, and rise above the table to a sufficient height to support a horizontal top wall 50, secured between the side walls 46, on a level providing adequate clearance for dishes stacked in trays 18 moving along the table 30. The top wall 50 is formed therethrough with parallel spaced rows of equally spaced round openings 52, here shown as being three rows each containing three openings 52. Each opening 52 conformably receives and exposes the wider lower end 54 of the glass envelopes of inverted electric lamps 56. The lamps 56 are of the infra-red or other suitable type, providing sufficient heat for efficient dish drying and affording sterilizing rays for sterilizing the dishes while drying the same.

The lamps 56 are engaged in sockets 58 mounted to the underside of a horizontal wall 60, provided with suitable heat insulation 62', and spaced parallel above the chamber top wall 50. The wall 60 is the top wall of a rectangular cross section forced air duct 62, which overlies the chamber 44 and extends outwardly therebeyond.

The forced air duct 62 has parallel perpendicular side walls 64 which extend upwardly from and can be extensions of the chamber side walls 46, and have downwardly curved outer ends, which are followed, as indicated at 66, by the outer end of the wall 60, to provide for the downward direction, onto dish trays 18, on the table 30, of dish and tray cooling forced air. A curved baffle 68, having the same radius of curvature as the duct end wall 66, extends across the duct between its side walls 64, is circumferentially spaced from the end wall 66, and serves to enhance the downward direction of the cooling forced air.

At its inner end, the duct 62 is open, except for the presence of an upstanding baffle wall 70, rising from the rear end of the top wall 50 of the chamber 44, and having an abbreviated perpendicular lower portion 72, and an upwardly and inwardly angled upper portion 74. The upper portion 64 extends into and across the downwardly facing rectangular outlet 76 of an electric blower 78.

The outlet 76, which is narrower than and is centered with respect to the chamber 44 is formed in the top outer end portion of a water stripping housing 80, which extends between the side wall 14 of the dishwasher 10, and the chamber 44. The housing 80 is open at its bottom, and has a top wall having side portions 82 which slant downwardly and laterally outwardly from the blower outlet 76, to abbreviated side walls 84, spaced above the table 30 and in line with the side walls of the chamber 44. The top wall of the housing 80 further comprises an inner intermediate portion 86, located between and joined to the inner edges of the side portions 82, and slanting downwardly and longitudinally inwardly to the rear ends 88 of the side walls 84, the ends 88 being in line with the inner edge 90 of the wall portion 86, and spaced outwardly from the dishwasher side wall 14, so as to leave an opening 92.

An outwardly and downwardly angled baffle wall 94 extends downwardly from the inner edge of the blower outlet 76, to the level of the chamber top wall 50, and has a lower edge 96 spaced from the chamber 44. A flexible weighted baffle 98 is suitably secured, at its upper end, as indicated at 100, to the lower part of the baffle wall 70, extends across the adjacent open end of the chamber 44 and is spaced upwardly from the table 30. The flexibility of the baffle 98 permits yielding contact thereof with dishes in moving trays, at the same time that it serves to keep forced air out of the the chamber 44, as the air comes down between the baffle walls 70 and 94, and strips water from trays and contained dishes, as the same pass beneath the housing 80.

In operation, trays and dishes contained therein, discharged from the washer 10, through its side wall opening 16, and forced along the table 30 by the washer discharge mechanism, are stripped of water by forced air as they pass beneath the housing 80, are dried and sterilized, by the action of the lamps 56, in the chamber 44, and are cooled as they emerge from the chamber 44, by the forced air passing through the duct 62 and directed downwardly by the duct's arcuate end wall 66, and the arcuate baffle 68.

A suitable and convenient wiring hook-up for the lamps 56 and the blower 78 is shown in FIGURE 3, which allows for operation of the lamps and the blower together. Power lines 102, 104, leading from a suitable source of electric current, have severally incorporated therein, contacts 106, 108 related to the arms 110, 112 of a master switch 114. Following the switch 114, the line 104 is connected by a wire 116, and a branch 118, to one side of the blower 78, a fuse 120 and a switch 122 being connected in the wire 116. The other side of the blower 78 is connected by a wire 124 to the power line 102.

The wire 124 is also connected to one side of a battery 126 of three of the lamps 56, which are connected together, and have their other side connected to the wire 116, so that, in any case, the lamp battery 126 operates when the blower 78 is operated. A second lamp battery 128, containing the remaining lamps 56, connected together, has one side thereof connected directly to the power line 102, and its other side connected to the power line 104, through a fuse 130 and a switch 132. This arrangement provides for operation of the lamp battery 128, in addition to the lamp battery 126, when desired.

What is claimed is:

1. For use with a dishwasher, a hood assembly disposed in receiving relation with respect to said washer, said hood assembly comprising a water stripping housing; a drying and sterilizing chamber, and a cooling air duct and a blower in outlet communication with the stripping housing and said duct, said chamber having a top wall, said duct comprising a top wall spaced above the chamber top wall and side walls extending down to the chamber, said duct walls extending beyond an end of the chamber, the top wall of the duct being curved downwardly to deflect air downwardly at a location beyond said one end of the chamber, the other end of the duct being in direct communication with the blower, an upstanding baffle on the chamber extending part way across the said other end of the duct and into the air stream issuing from the blower, said stripping housing having a top wall formed with a blower outlet opening into which said upstanding baffle extends, the housing top wall having a downwardly extending baffle spaced from the upstanding baffle, said upstanding baffle serving to direct air from the blower into the duct and to direct air from the blower down into the stripping housing, said downwardly extending baffle cooperating with the upstanding baffle to direct air from the blower downwardly into the stripping housing.

2. A device according to claim 1, wherein said air enters said stripping housing at the end of said chamber, and a pendant flexible baffle extending downwardly across the adjacent end of the chamber from the top wall of the chamber, the pendant baffle being in line with the upstanding baffle and serving to limit entrance of air from the blower into the chamber.

3. For use with a dishwasher, a hood assembly disposed in receiving relation with respect to said washer, said hood assembly comprising a water stripping housing; a drying and sterilizing chamber, and a cooling air duct and a blower in outlet communication with the stripping housing and said duct, said chamber having a top wall and side walls disposed along and extending downwardly therefrom, said top wall being formed with openings, and heating and sterilizing means supported on the hood assembly and exposed in said openings, said duct having a top wall spaced above and extending along the top wall of the chamber, said heating and sterilizing means being mounted to the top wall of the duct, said duct having side walls extending downwardly from its top wall and enclosing the heating and sterilizing means.

References Cited
UNITED STATES PATENTS

| | | | |
|---|---|---|---|
| 1,846,703 | 2/1932 | Wiener | 134—72 |
| 2,281,184 | 4/1942 | Dykestra et al. | 34—39 X |
| 2,347,407 | 4/1944 | Goodwin et al. | |
| 2,633,437 | 3/1953 | Detjen | 134—72 X |
| 2,698,627 | 1/1955 | Kearney et al. | 134—72 X |
| 2,831,267 | 4/1958 | Gardner | 34—4 X |
| 3,175,565 | 3/1965 | Dawson | 34—216 X |

FREDERICK L. MATTESON, JR., *Primary Examiner.*

A. D. HERRMANN, *Assistant Examiner.*